United States Patent
Shiratori et al.

(10) Patent No.: US 12,467,881 B2
(45) Date of Patent: Nov. 11, 2025

(54) INFORMATION PROCESSING DEVICE, INFORMATION PROCESSING METHOD, AND COMPUTER-READABLE STORAGE MEDIUM

(71) Applicant: TOYOTA JIDOSHA KABUSHIKI KAISHA, Toyota (JP)

(72) Inventors: Hanae Shiratori, Susono (JP); Masao Yano, Susono (JP); Tetsuya Shoji, Susono (JP); Yasuhiro Toyama, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 18/498,825

(22) Filed: Oct. 31, 2023

(65) Prior Publication Data
US 2024/0159690 A1    May 16, 2024

(30) Foreign Application Priority Data
Nov. 11, 2022    (JP) .................... 2022-181359

(51) Int. Cl.
G01N 23/04    (2018.01)
(52) U.S. Cl.
CPC ....... *G01N 23/04* (2013.01); *G01N 2223/054* (2013.01); *G01N 2223/1016* (2013.01)

(58) Field of Classification Search
CPC ............ G01N 23/04; G01N 2223/054; G01N 2223/1016
See application file for complete search history.

(56) References Cited

U.S. PATENT DOCUMENTS

| | | | |
|---|---|---|---|
| 2014/0112438 A1* | 4/2014 | Mountney | A61B 6/5211 378/62 |
| 2022/0091049 A1 | 3/2022 | Ota et al. | |

FOREIGN PATENT DOCUMENTS

| | | | | |
|---|---|---|---|---|
| CN | 118624653 A | * | 9/2024 | ........... G01N 23/223 |
| JP | 2022-052102 A | | 4/2022 | |

* cited by examiner

*Primary Examiner* — David P Porta
*Assistant Examiner* — Fani Polyzos Boosalis
(74) *Attorney, Agent, or Firm* — Sughrue Mion, PLLC (57) ABSTRACT

An information processing device includes: an acquiring section acquiring small angle scattering data obtained by measuring a material, and supplemental information that is two-dimensional data of the material; and a predicting section that, by using the small angle scattering data and the supplemental information as input, predicts a three-dimensional structure of the material from output of a prediction model that is learned in advance and that is for predicting the three-dimensional structure of the material.

6 Claims, 9 Drawing Sheets

INFORMATION PROCESSING DEVICE, INFORMATION PROCESSING METHOD, AND COMPUTER-READABLE STORAGE MEDIUM

CROSS-REFERENCE TO RELATED APPLICATION

This application is based on and claims priority under 35 USC § 119 from Japanese Patent Application No. 2022-181359 filed on Nov. 11, 2022, the disclosure of which is incorporated by reference herein.

BACKGROUND

Technical Field

The present disclosure relates to an information processing device, an information processing method, and a computer-readable storage medium.

Related Art

Japanese Patent Application Laid-Open (JP-A) No. 2022-052102 (Patent Document 1) discloses a technique of computing Talbot orientation information on the basis of a Talbot image of a sample, and, on the basis of the computed Talbot orientation information, structurally analyzing the sample. In this technique, a learning device for carrying out machine learning of some of the structure analyzing processings is provided, and learning is carried out by associating sample production information and Talbot images, and sample production information and Talbot orientation information.

In prior art techniques such as JP-A No. 2022-052102 (Patent Document 1), a technique that learns structure analysis is proposed, but the technique does not predict a three-dimensional structure. Further, there is no technique that predicts a three-dimensional structure while taking various factors of the structure of a material into consideration.

SUMMARY

An object of the present disclosure is to provide an information processing device, an information processing method, and a computer-readable storage medium that can accurately predict the three-dimensional structure of a material.

An information processing device relating to a first aspect includes: an acquiring section acquiring small angle scattering data obtained by measuring a material, and supplemental information that is two-dimensional data of the material; and a predicting section that, by using the small angle scattering data and the supplemental information as input, predicts a three-dimensional structure of the material from output of a prediction model that is learned in advance and that is for predicting the three-dimensional structure of the material.

Small angle scattering data and supplemental information are inputted to the information processing device relating to the first aspect. Due thereto, a three-dimensional structure can be predicted accurately in accordance with the supplemental information.

In an information processing device relating to a second aspect, in the information processing device of the first aspect, the prediction model, to which the small angle scattering data and the supplemental information have respectively been inputted, respectively outputs, as a spectrum pattern of a structure, a form factor relating to a particle shape distribution of the material, a structure factor relating to a distance distribution of the material, and a small angle scattering pattern determined from the form factor and the structure factor, and, from output of the prediction model, the predicting section predicts three-dimensional structure parameters relating to the material whose candidates and ranges have been narrowed by the supplemental information.

In accordance with the information processing device relating to the second aspect, prediction of three-dimensional structure parameters is possible from the output of a form factor, a structure factor and a small angle scattering pattern from the prediction model.

In an information processing device relating to a third aspect, in the information processing device of the second aspect, the prediction model includes a three-dimensional model and a two-dimensional model, the three-dimensional model is a model that, by using small angle scattering data as input, outputs the form factor, the structure factor and the small angle scattering pattern in three dimensions, the two-dimensional model is a model that, by using supplemental information as input, outputs results of estimating output of the three-dimensional model, and, by comparing output of the three-dimensional model and output of the two-dimensional model, the predicting section narrows the candidates and the ranges of the three-dimensional structure parameters, and predicts the three-dimensional structure parameters. In accordance with the information processing device of the third aspect, by narrowing the candidates and ranges by comparing the output of the three-dimensional model and the output of the two-dimensional model to which the supplemental information was inputted, three-dimensional structure parameters can be predicted accurately.

In an information processing device relating to a fourth aspect, the information processing device relating to the first aspect further includes a pre-processing section and a learning section, wherein the pre-processing section creates a three-dimensional structure for learning by using sample information for learning as input, and outputs explanatory variables relating to the three-dimensional structure parameters and objective variables that are results of Fourier transform of a predetermined three-dimensional structure, which explanatory variables and objective variables are obtained for the three-dimensional structure for learning, and the learning section learns the prediction model by using the explanatory variables and the objective variables as input. In accordance with the information processing device relating to the fourth aspect, a prediction model, which is for accurately predicting the three-dimensional structure of a material, can be learned.

In an information processing method relating to a fifth aspect, a computer executes processings of: acquiring small angle scattering data obtained by measuring a material, and supplemental information that is two-dimensional data of the material; and, by using the small angle scattering data and the supplemental information as input, predicting a three-dimensional structure of the material from output of a prediction model that is learned in advance and that is for predicting the three-dimensional structure of the material.

An information processing program relating to a sixth aspect causes a computer to execute processings of: acquiring small angle scattering data obtained by measuring a material, and supplemental information that is two-dimensional data of the material; and, by using the small angle scattering data and the supplemental information as input, predicting a three-dimensional structure of the material from output of a prediction model that is learned in advance and that is for predicting the three-dimensional structure of the material.

In accordance with the technique of the present disclosure, the three-dimensional structure of a material can be predicted accurately.

DETAILED DESCRIPTION

An overview of an embodiment of the present invention is described. The present embodiment proposes a technique of accurately predicting the three-dimensional structure of a sample by using a learned prediction model and by providing supplemental information that is two-dimensional data of a material.

Figure 1:
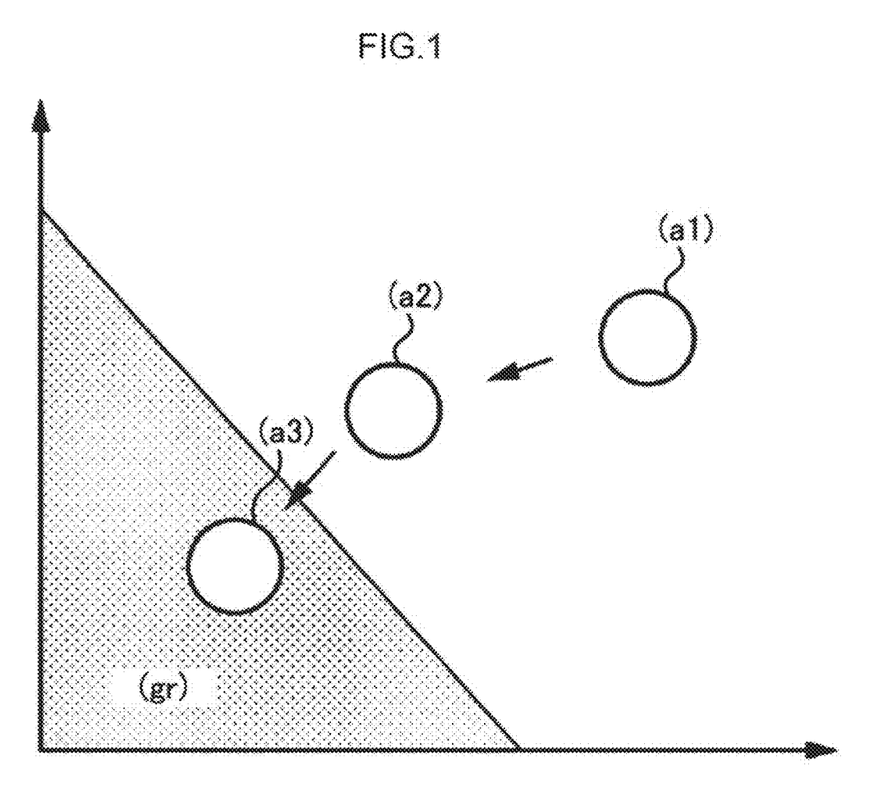
FIG. 1 is a graph illustrating an image in a case of predicting a three-dimensional structure in a parameter space of the three-dimensional structure.

FIG. 1 is a graph illustrating an image in a case of predicting a three-dimensional structure in the parameter space of the three-dimensional structure. The vertical axis in the graph is the structure factor, the horizontal axis is the form factor, and three-dimensional structures (a1)~(a3) that are predicted from measured data are plotted. Form factors and structure factors are explained later. The measured data is small angle scattering (SAS) data and a microscope image. A good quality range (gr) can be prescribed by comparing the measured data and the predicted three-dimensional structures. Further, the impact, on the three-dimensional structure parameters, of process parameters of two dimensions relating to design can be quantified. The process parameters are material production values or values used for the material specifications, and are values of structure parameters of two dimensions that are estimated from a microscope image.

Figure 2:
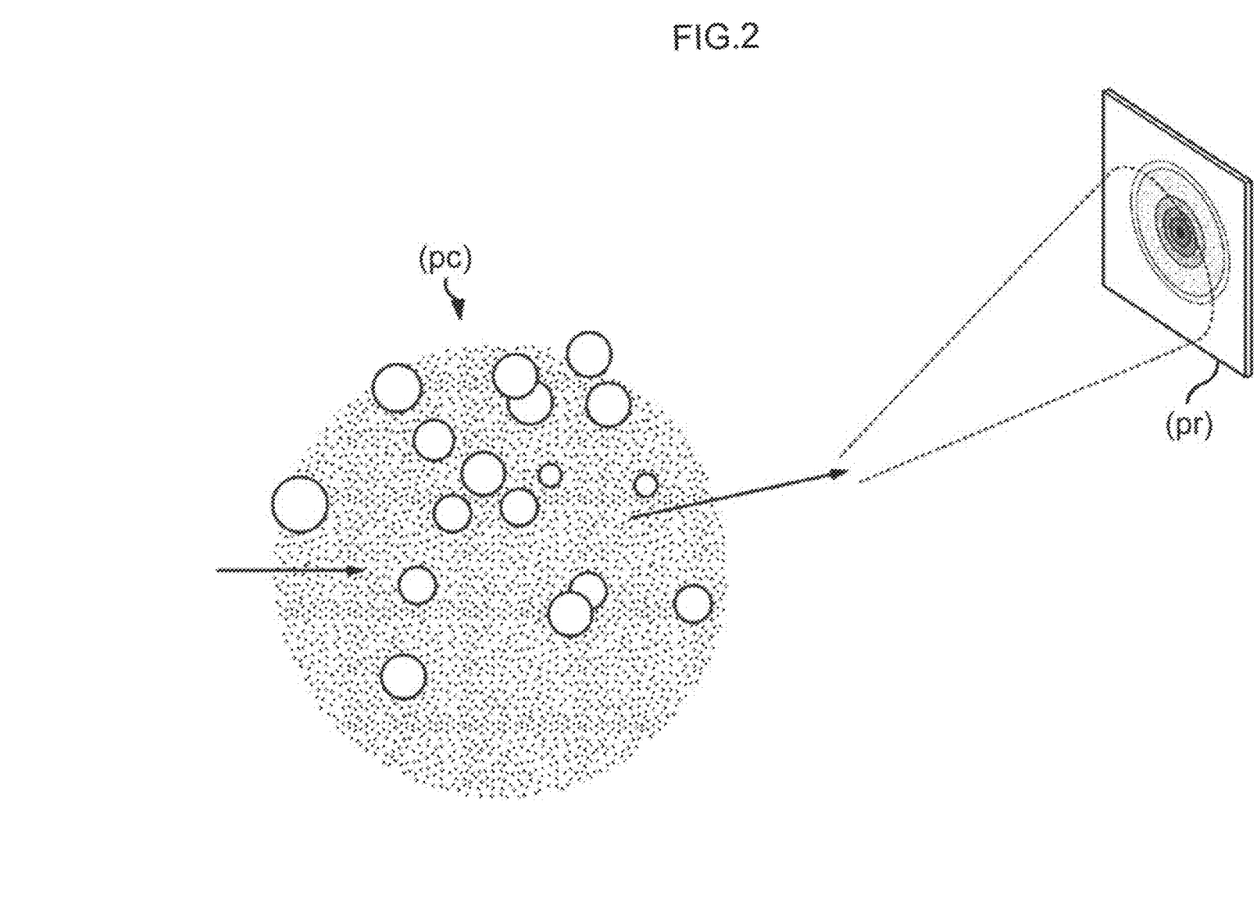
FIG. 2 is a drawing illustrating an image of the small angle X-ray scattering method.
Figure 3:
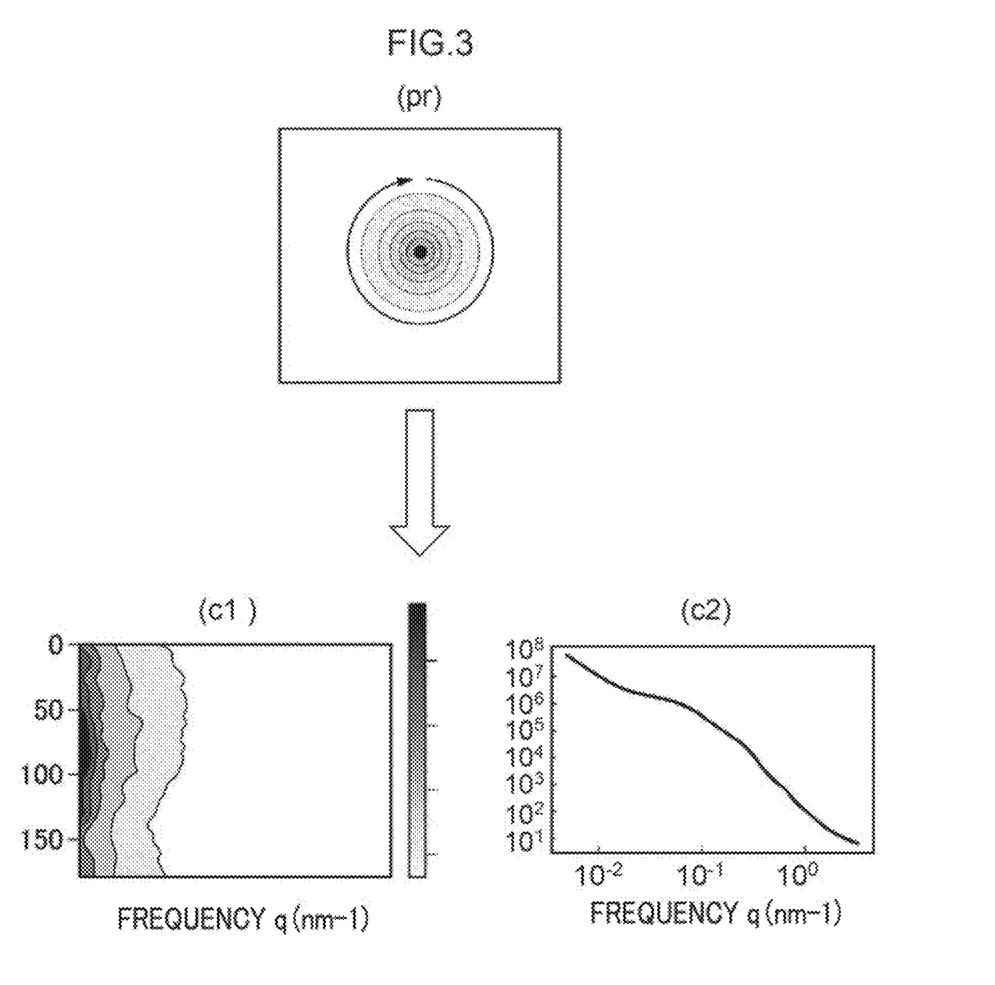
FIG. 3 is a drawing illustrating an example of data that can be acquired from a two-dimensional scattering profile.

In the present embodiment, a small angle X-ray scattering (SAXS) method, which irradiates X-rays onto the material of a sample and analyzes structural information from the obtained scattered X-rays, is used as a technique of measuring small angle scattering data as a three-dimensional structure. FIG. 2 is a drawing illustrating an image of the small angle X-ray scattering method. For each particle (pc), information that is the size distribution, the shape, the electron density distribution, and the interparticle distance is included, and a two-dimensional scattering profile (pr) is obtained. FIG. 3 is a drawing illustrating an example of data that can be obtained from a two-dimensional scattering profile. Power spectrum (c1) and azimuth-integrated power spectrum (c2) are obtained from the two-dimensional scattering profile. The vertical axis in (c1) is azimuth (θ), and the horizontal axis is frequency q(nm−1). The darker portions are the spectrum components. The vertical axis in (c2) is the scattering strength, and the horizontal axis is frequency q(nm−1). In the present embodiment, (c1) and (c2) are acquired as small angle scattering (SAS) data that are obtained by measuring a sample.

Figure 4:
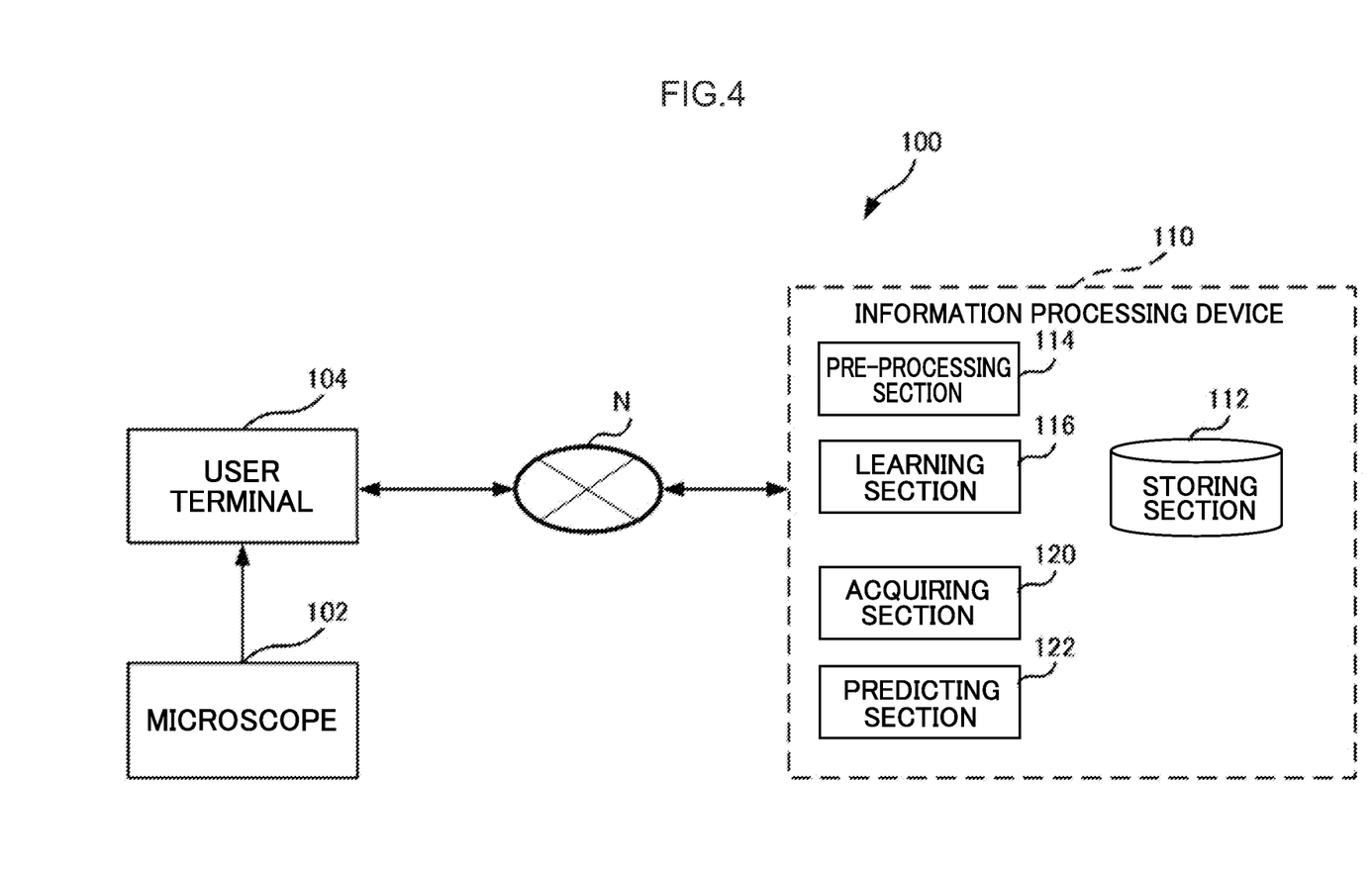
FIG. 4 is a drawing illustrating the structure of an information processing system.

FIG. 4 is a drawing illustrating the structure of an information processing system 100. As illustrated in FIG. 4, in the information processing system 100, a microscope 102, a user terminal 104, and an information processing device 110 are connected via network N such as the internet or the like. The microscope 102 is a scanning electron microscope (SEM) or a transmission electron microscope (TEM), and captures images of the material that is the object of prediction. The user terminal 104 transmits, to the information processing device 110, the small angle scattering data of the material that is the object of prediction, and the microscope image obtained by the material having been imaged by the microscope 102.

Figure 5:
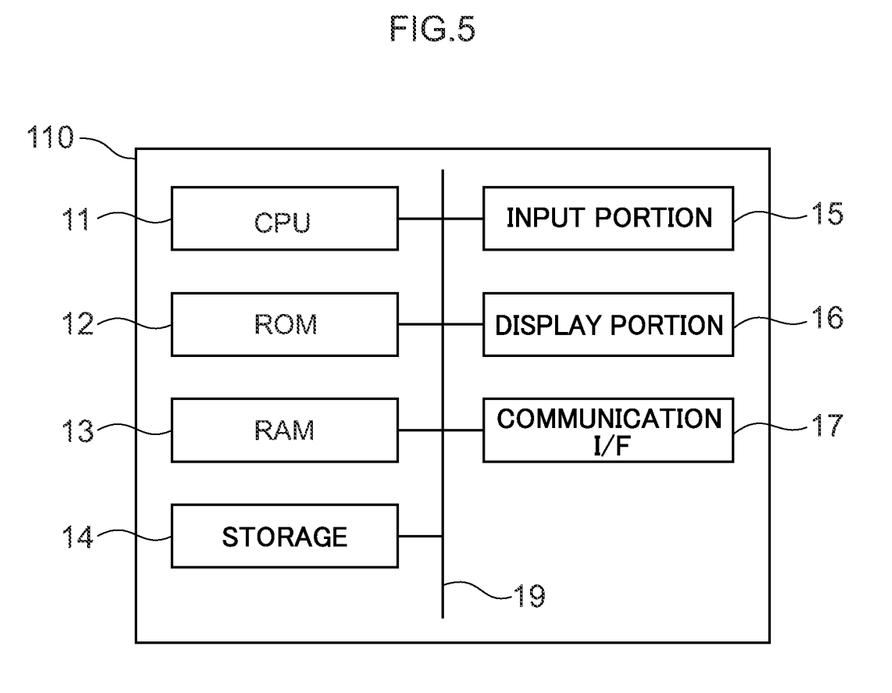
FIG. 5 is a block drawing illustrating hardware structures of an information processing device.

FIG. 5 is a block drawing illustrating hardware structures of the information processing device 110. As illustrated in FIG. 5, the information processing device 110 has a CPU (Central Processing Unit) 11, a ROM (Read Only Memory) 12, a RAM (Random Access Memory) 13, a storage 14, an input portion 15, a display portion 16 and a communication interface (I/F) 17. These respective structures are connected so as to be able to communicate with one another via bus 19.

The CPU 11 is a central computing processing unit, and executes various programs and controls respective sections. Namely, the CPU 11 reads-out programs from the ROM 12 or the storage 14, and executes the programs by using the RAM 13 as a workspace. The CPU 11 carries out control of the above-described respective structures, and various computing processings, in accordance with the programs that are stored in the ROM 12 or the storage 14. In the present embodiment, an information processing program is stored in the ROM 12 or the storage 14.

The ROM 12 stores various programs and various data. The RAM 13 temporarily stores programs and data as a workspace. The storage 14 is structured by a storage device such as an HDD (Hard Disk Drive) or an SSD (Solid State Drive) or the like, and stores various programs, including the operating system, and various data.

The input portion 15 includes a pointing device, such as a mouse or the like, and a keyboard, and is used in order to carry out various types of input.

The display portion 16 is, for example, a liquid crystal display, and displays various information. By using a touch panel display therefor, the display portion 16 may function as the input portion 15.

The communication interface 17 is an interface for communicating with other equipment such as terminals or the like. For example, standards for wired communication such as Ethernet® or FDDI or the like, or standards for wireless communication such as 4G, 5G, or Wi-Fi® or the like, are used in this communication.

The respective functional structures of the information processing device 110 of FIG. 4 are described. The information processing device 110 is structured so as to functionally include a storing section 112, a pre-processing section 114, a learning section 116, an acquiring section 120, and a predicting section 122. These respective functional structures are realized due to the CPU 11 reading-out the information processing program stored in the ROM 12 or the storage 14, and expanding and executing the program in the RAM 13. Note that the pre-processing section 114 and the learning section 116 are processing sections for learning a prediction model, and the acquiring section 120 and the predicting section 122 are processing sections for predicting the three-dimensional structure. Further, the pre-processing section 114 and the learning section 116 may be provided as external devices, and the information processing device 110 may acquire a prediction model that has been learned at the external devices.

Sample information for learning, and a prediction model that has been learned at the learning section 116 and that is described later, are stored in the storing section 112. The sample information for learning is average particle diameter μ, particle shape distribution σ, volume fraction α, and the position (generatrix) of the central point of the particle.

Figure 6:
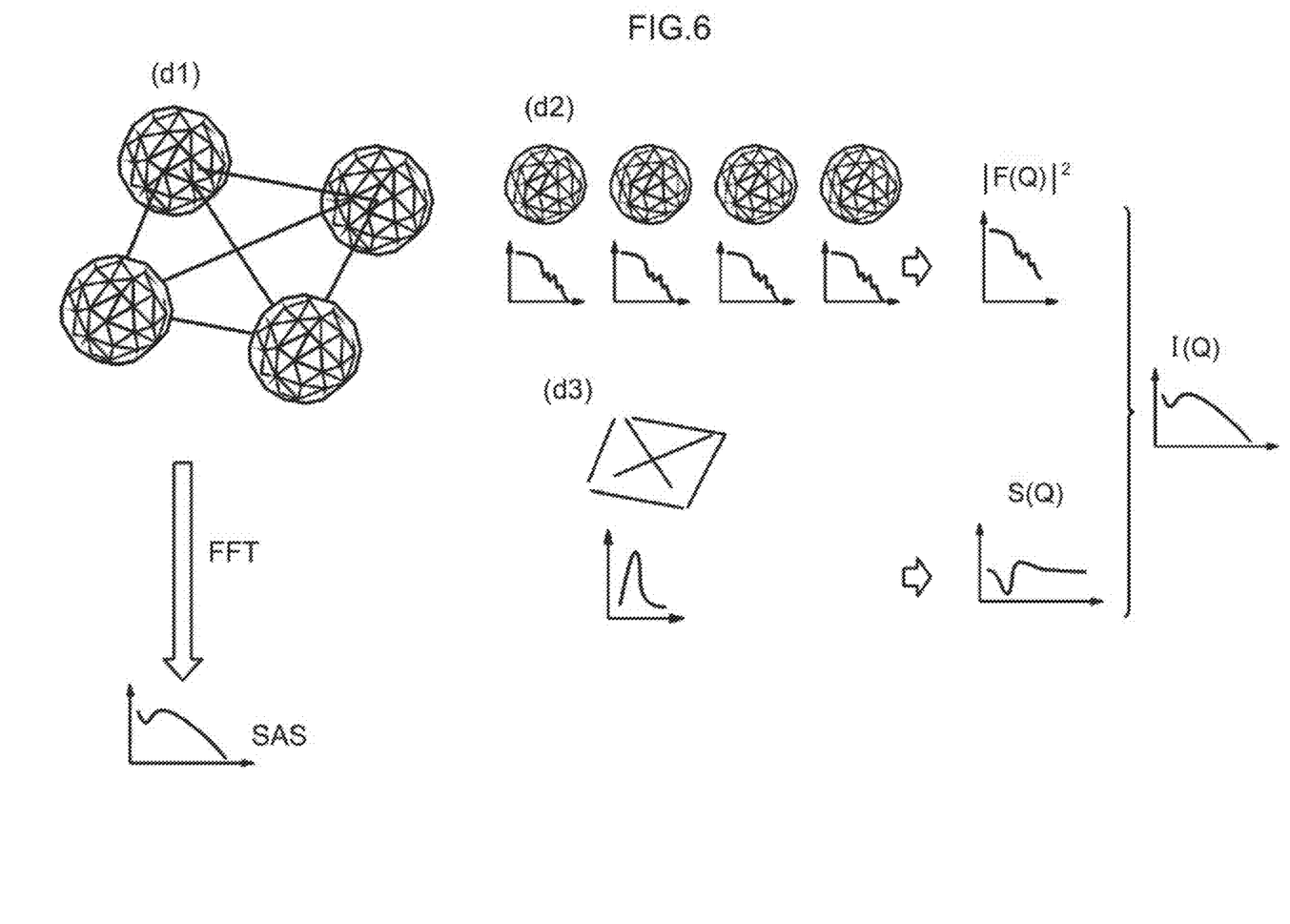
FIG. 6 is a drawing illustrating a schematic image of a form factor and a structure factor.

Form factors and structure factors are described here. FIG. 6 is a drawing illustrating schematic images of form factors and structure factors. Form factor (d2) and structure factor (d3) are factors obtained from the distribution of three-dimensional structure (d–1) (hereinafter, the distribution is simply called the three-dimensional structure). Small angle scattering (SAS) data is obtained by carrying out Fourier transform (FFT: Finite Fourier Transform) on the three-dimensional structure. Form factors are factors relating to the particle shape distribution of the material, and are the particle size distribution and the particle shape. Structure factors relate to the distance distribution of the material, and are the interparticle distance, the periodicity, the orientation, the network between particles (degree of communication), the air removal rate, and the like. The structure factor is a radial distribution function. When the form factor and the structure factor are respectively Fourier-transformed, $|F(Q)|^2$, which is the sum of the logs for the Fourier transforms $(FFT)^2$ of the respective particle diameters, is obtained for the form factor. $S(Q)$, in which the distance distribution is Fourier-transformed from the radial distribution function, is obtained for the structure factor. The respective results of Fourier transform of the form factor and the structure factor are combined ($I(Q)=S(Q)*|F(Q)|^2$). $I(Q)$ that is obtained by the combining is the observation pattern of the small angle scattering data (is the small angle scattering pattern), and the three-dimensional structure of the material can be predicted therefrom. Note that symbols that include (Q) in the following description are results of Fourier transform or are combinations of Fourier transform results.

(Learning Processing)

By using sample information for learning as input, the pre-processing section 114 creates a three-dimensional structure for learning. The pre-processing section 114 outputs the explanatory variables and objective variables obtained for the three-dimensional structure for learning to the learning section 116. The explanatory variables are three-dimensional structure parameters, and the objective variables are the Fourier transform results (the results of Fourier transform of the three-dimensional structure and the results of Fourier transform of the cross-sections). The three-dimensional structure parameters are characteristic amounts such as the average particle diameter μ, the particle shape distribution σ, the volume fraction α, the position (generatrix) of the central point of the particle, the interparticle distance, the periodicity, the orientation, the network between particles (communication degree), the air removal rate, and the like. Further, the pre-processing section 114 Fourier-transforms the three-dimensional structure, and obtains the results of Fourier transform of the three-dimensional structure and the results of Fourier transform of the cross-sections, and uses these as the objective variables.

By using the explanatory variables and the objective variables as input, the learning section 116 learns a prediction model for predicting the three-dimensional structure of the material. The prediction model is a model structured from a three-dimensional model and a two-dimensional model. In each of the two-dimensional model and the three-dimensional model, the form factor relating to the particle shape distribution of the material and the structure factor relating to the distance distribution of the material are estimated, and a small angle scattering pattern is estimated on the basis of these respective factors. It suffices to use an arbitrary technique, such as a random forest that can learn a spectrum pattern, or the like, as the technique for learning the prediction model.

Figure 7:
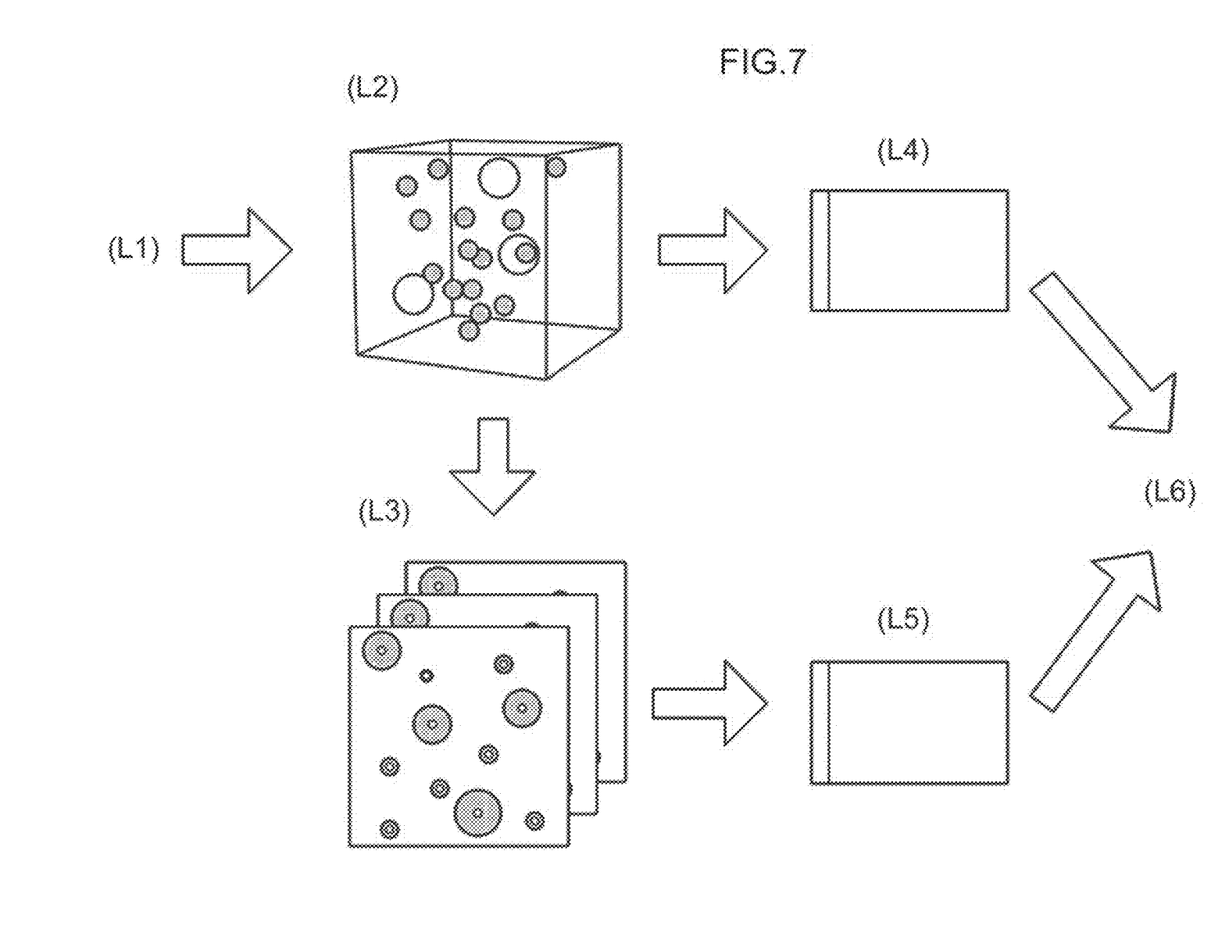
FIG. 7 is a drawing illustrating an image of learning a prediction model.

FIG. 7 is a drawing illustrating an image of learning the prediction model. In (L1), sample information for learning (μ, σ, α and the like) are inputted, and in (L2), a three-dimensional structure for learning is created. Then, in (L3), Fourier transform results of the respective cross-sections of the two-dimensional structure are obtained. In (L4), a three-dimensional model is learned by using the results of Fourier transform of the three-dimensional structure as objective variables. In (L5), a two-dimensional model is learned by using the results of Fourier transform of the respective cross-sections of the two-dimensional structure as objective variables.

Note that the output of the three-dimensional model can be estimated from the outputs of the respective cross-sections of the two-dimensional model (F(Q), S(Q), I(Q) of two dimensions). Therefore, in (L6), by comparing the output of the three-dimensional model and the output of the two-dimensional model, candidates for and ranges of the three-dimensional structure parameters can be narrowed down. In the following predicting processing, supplemental information, which is a microscope image and small angle scattering data, are used as input to the two-dimensional model, and the candidates and the ranges of the three-dimensional structure parameters can be narrowed.

This narrowing is carried out by using supplemental information. The supplemental information is production values, or the average particle diameter μ, particle shape distribution σ, volume fraction α and the like that are digitized from the microscope image. In the predicting processing described hereinafter, an example is used in which a microscope image is used as supplemental information, and the results of Fourier transform are inputted to the two-dimensional model, and the candidates and ranges of the three-dimensional structure parameters are narrowed.

As described above, in the present embodiment, a prediction model, which has learned the relation between small angle scattering data, Fourier transform of a microscope image (supplemental information) and three-dimensional structure parameters, is prepared. Note that, although the above describes an example of a case of learning by dividing the prediction model into a three-dimensional model and a two-dimensional model, the present disclosure is not limited to this. For example, learning may be carried out by using only a three-dimensional model as the prediction model, and ranges of narrowing that correspond to the numerical values of the supplemental information may be set in advance. In this case, the numerical values of the supplemental information are inputted to the prediction model, and candidates and ranges of three-dimensional structure parameters in the small angle scattering pattern of three dimensions outputted from the prediction model are narrowed.

(Predicting Processing)

The acquiring section 120 acquires small angle scattering data and supplemental information (a microscope image) from the user terminal 104.

By using the small angle scattering data and the supplemental information as input, the predicting section 122 predicts a three-dimensional structure from the output of a prediction model to which the small angle scattering data and the supplemental information are respectively inputted. The predicted three-dimensional structure is three-dimensional structure parameters (three-dimensional structure characteristic amounts) relating to the material whose candidates and ranges have been narrowed by the supplemental information, and are, for example, the average particle diameter $\mu$, the particle shape distribution $\sigma$, and the volume fraction $\alpha$. Note that the predicting section 122 inputs the small angle scattering data and the supplemental information to the prediction model. Further, the predicted three-dimensional structure data may include a form factor, a structure factor and a small angle scattering pattern.

In detail, due to the predicting section 122 comparing the output of the three-dimensional model and the output of the two-dimensional model in the prediction model, the predicting section 122 carries out narrowing of the candidates and ranges of the three-dimensional structure parameters, and predicts three-dimensional structure parameters that correspond to the narrowed results. Note that the predicting section 122 inputs the small angle scattering data to the three-dimensional model, and inputs the supplemental information to the two-dimensional model.

By using the small angle scattering data as input, the three-dimensional model outputs, as the spectrum pattern of the structure, the form factor $F(Q)$, the structure factor $S(Q)$, and the small angle scattering pattern $I(Q)$ that is determined from the form factor and the structure factor. By using the supplemental information as input, the two-dimensional model outputs results of estimating the output of the three-dimensional model. The results of estimation are an estimated form factor $F'(Q)$, an estimated structure factor $S'(Q)$ and an estimated small angle scattering pattern $I'(Q)$ of three dimensions, which are determined from the $F(Q)$, $S(Q)$, $I(Q)$ of two dimensions that were outputted from the two-dimensional model. Note that the results of estimation may be determined by a two-dimensional model, or may be determined by processing of the predicting section 122. It suffices for the predicting section 122 to compare the output of the three-dimensional model described above and the results of estimation, and narrow the candidates and ranges to outputs that coincide with the results of estimation or are within ranges of threshold values, and output the three-dimensional structure parameters as results of prediction.

(Flow of Control)

Figure 8:
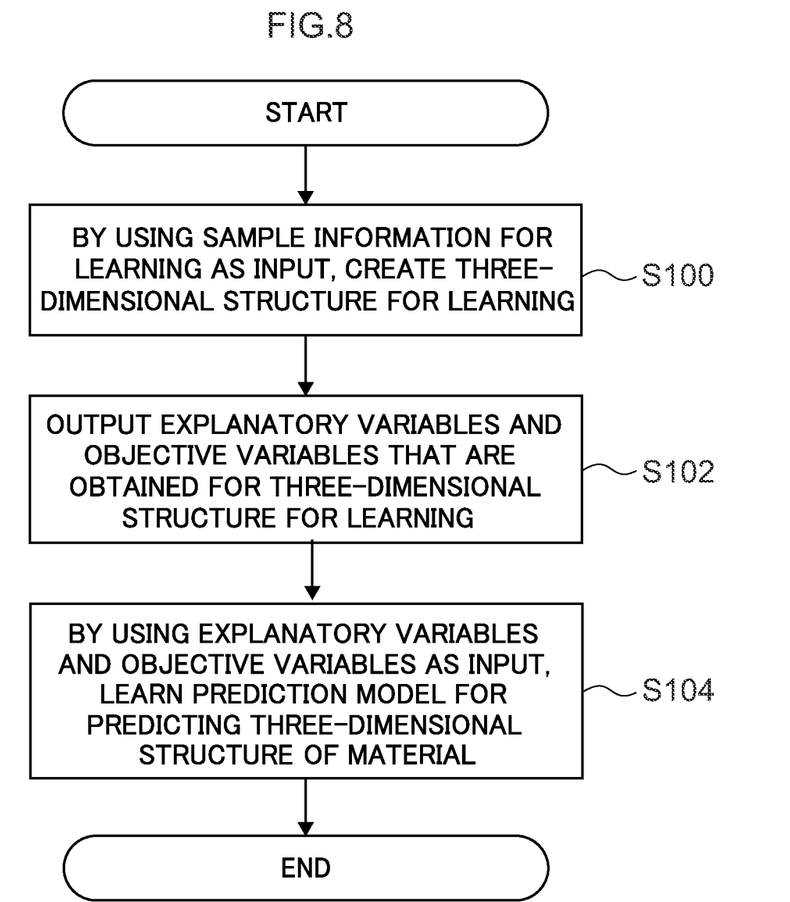
FIG. 8 is a flowchart serving as learning processing executed by the information processing device.
Figure 9:
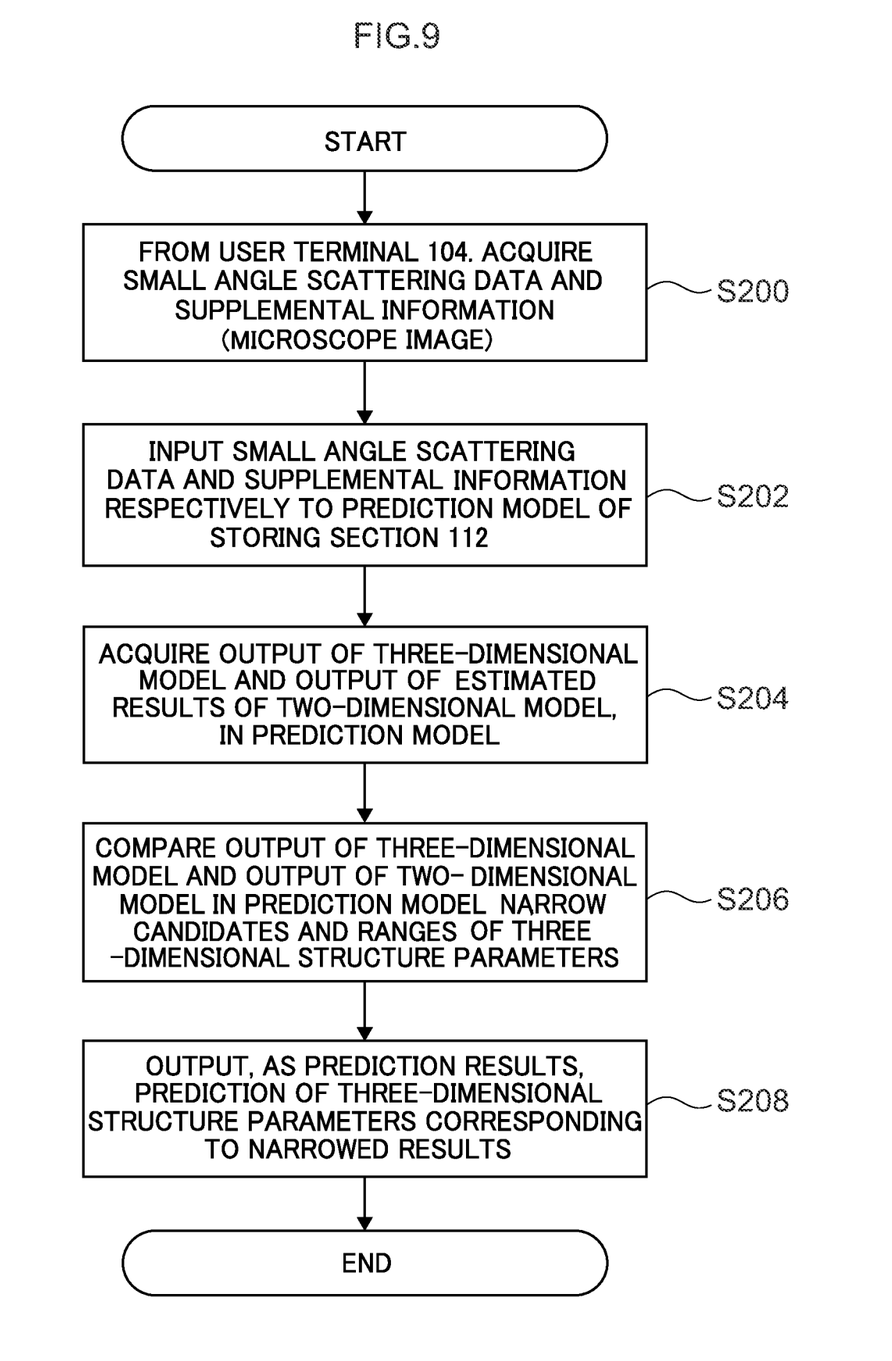
FIG. 9 is a flowchart serving as predicting processing executed by the information processing device.

The flow of the processing, which serves as the information processing method executed at the information processing device 110 of the present embodiment, is described by using the flowcharts of FIG. 8 and FIG. 9. The processing at the information processing device 110 is executed due to the CPU 11 functioning as the respective sections.

FIG. 8 is a flowchart that serves as the learning processing executed by the information processing device 110.

In step S100, by using sample information for learning as input, the CPU 11 creates a three-dimensional structure for learning.

In step S102, the CPU 11 outputs, to the learning section 116, explanatory variables and objective variables obtained for the three-dimensional structure for learning.

In step S104, by using the explanatory variables and the objective variables as input, the CPU 11 learns a prediction model in order to predict a three-dimensional structure of the material. The prediction model is a model structured from a three-dimensional model and a two-dimensional model. The learned prediction model is stored in the storing section 112.

FIG. 9 is a flowchart that serves as the predicting processing executed by the information processing device 110.

In step S200, the CPU 11 acquires small angle scattering data and supplemental information (a microscope image) from the user terminal 104.

In step S202, the CPU 11 inputs the small angle scattering data and the supplemental information respectively to the prediction model of the storing section 112.

In step S204, the CPU 11 acquires the output of the three-dimensional model and the output of the estimated results of the two-dimensional model in the prediction model.

In step S206, the CPU 11 compares the output of the three-dimensional model and the output of the two-dimensional model in the prediction model, and narrows the candidates and the ranges of the three-dimensional structure parameters.

In step S208, the CPU 11 outputs, as results of prediction, the prediction of the three-dimensional structure parameters that correspond to the narrowed results.

As described above, the information processing device 110 of the present embodiment can accurately predict the three-dimensional structure of a material. Further, the information processing device 110 can predict three-dimensional structure parameters from the outputs of a form factor, a structure factor and a small angle scattering pattern by the prediction model.

Note that any of various types of processors other than a CPU may execute the various processings that are executed due to the CPU 11 reading-in software (a program) in the above-described embodiment. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the above-described respective processings may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, in the above embodiment, the information processing program is described as being stored in advance (installed) on a computer-readable, non-transitory recording medium. For example, the information processing program is stored in advance in the ROM 12 or the storage 14. However, the present disclosure is not limited to this, and the program may be provided in a form of being recorded on a non-transitory recording medium such as a CD-ROM (Compact Disk Read Only Memory), a DVD-ROM (Digital Versatile Disk Read Only Memory), a USB (Universal Serial Bus) memory or the like. Further, the information processing program may be in a form of being downloaded from an external device via a network.

The flows of the processings described in the above embodiment are examples, and unnecessary steps may be deleted therefrom, new steps may be added thereto, or the order of processings may be rearranged, with a scope that does not depart from the gist of the present disclosure.

What is claimed is:

1. An information processing device comprising:
at least one processor that is configured to:
acquire small angle scattering data obtained by measuring a material, and supplemental information that is two-dimensional data of the material; and
by using the small angle scattering data and the supplemental information as input, predict a three-dimensional structure of the material from output of a prediction model that is learned in advance and that is for predicting the three-dimensional structure of the material.

2. The information processing device of claim 1, wherein
the prediction model, to which the small angle scattering data and the supplemental information have respectively been inputted, respectively outputs, as a spectrum pattern of a structure, a form factor relating to a particle shape distribution of the material, a structure factor relating to a distance distribution of the material, and a small angle scattering pattern determined from the form factor and the structure factor, and
the at least one processor is configured to predict, from output of the prediction model, three-dimensional structure parameters relating to the material whose candidates and ranges have been narrowed by the supplemental information.

3. The information processing device of claim 2, wherein
the prediction model includes a three-dimensional model and a two-dimensional model,
the three-dimensional model is a model that, by using small angle scattering data as input, outputs the form factor, the structure factor and the small angle scattering pattern in three dimensions,
the two-dimensional model is a model that, by using supplemental information as input, outputs results of estimating output of the three-dimensional model, and
the at least one processor is configured to narrow the candidates and the ranges of the three-dimensional structure parameters by comparing output of the three-dimensional model and output of the two-dimensional model, and predict the three-dimensional structure parameters.

4. The information processing device of claim 1 wherein
at least one processor that is configured to:
create a three-dimensional structure for learning by using sample information for learning as input, and output explanatory variables relating to the three-dimensional structure parameters and objective variables that are results of Fourier transform of a predetermined three-dimensional structure, which explanatory variables and objective variables are obtained for the three-dimensional structure for learning, and
learn the prediction model by using the explanatory variables and the objective variables as input.

5. An information processing method in which a computer executes processings of:
acquiring small angle scattering data obtained by measuring a material, and supplemental information that is two-dimensional data of the material; and
by using the small angle scattering data and the supplemental information as input, predicting a three-dimensional structure of the material from output of a prediction model that is learned in advance and that is for predicting the three-dimensional structure of the material.

6. A non-transitory computer-readable storage medium storing an information processing program causing a computer to execute processings of:
acquiring small angle scattering data obtained by measuring a material, and supplemental information that is two-dimensional data of the material; and
by using the small angle scattering data and the supplemental information as input, predicting a three-dimensional structure of the material from output of a prediction model that is learned in advance and that is for predicting the three-dimensional structure of the material.

* * * * *